Patented Aug. 19, 1941

2,253,166

UNITED STATES PATENT OFFICE 2,253,166

HYDROXYALKYL MONO ETHERS OF P,P'-DIHYDROXY DIPHENYL AMINES AND PROCESS FOR MAKING SAME

Newell M. Bigelow and John Elton Cole, Wilmington, Del., assignors to E. I. du Pont de Nemours & Company, Wilmington, Del., a corporation of Delaware No Drawing. Application February 24, 1939,
Serial No. 258,172

13 Claims. (Cl. 260—571)

This invention relates to new compounds which are useful as intermediates for making sulfur colors, and especially to (hydroxy alkylene-oxy)-(hydroxy phenylene amino)-arylenes.

Intermediates for sulfur dyes of the type 4(alkoxy)-4'-hydroxy-diphenylamine are known. The products made from these intermediates by thionation have the disadvantage of being somewhat difficultly soluble and when dyebaths are made from such prior art thionated products much care has to be taken to avoid as much as possible the presence of undissolved particles and tarry lumps in the solutions. Tarry and undissolved lumps are a cause of specky dyeings. In general, sulfur dyes are used where low cost dyeings are desired. They are commonly used in large quantities to dye heavy weight materials. Accordingly, when large dyebaths are made the properties of the dyes which will avoid specky dyeings and will enable rapid and complete solution thereof, are of great practical importance. Although most sulfur dyestuffs of the prior art can be oxidized on the fiber by the action of air, as a practical matter those prior art dyes referred to generally oxidize relatively slowly, and they require a chemical after-treatment of the dyed fiber with an oxidizing reagent, such as sodium perborate or sodium peroxide in order to develop the color within a period of time that can be allowed for this purpose in practical dyeing operations. It was, therefore desirable to provide dyestuffs which would not give specky dyeings, which could be more easily dissolved, which would readily oxidize on the fiber by the action of air, and which would be more fast to bleaching agents than the prior art dyestuffs referred to.

It is an object of the present invention to provide new intermediates for sulfur dyes from which more readily and completely soluble thionated compounds can be produced. Another object of the invention is to provide new intermediates for sulfur dyes which after thionation, dyeing on the fiber and oxidation have improved fastness to bleaching agents. Other objects of the invention will be apparent from the following more detailed description.

The objects of the invention are attained in general by melting together and heating until condensation has taken place, a hydroquinone and a compound represented in general by the formula $$(HO)_n R(O-Arylene-NH_2)_m$$
$$|$$
$$X$$

in which Arylene is the nucleus of a compound of the benzene series, R contains 2 to 6 carbons and is an alkylene or cycloalkylene radical, X is one to four members in any combination thereof of the group consisting of hydrogen, methyl, ethyl, propyl, the corresponding alkoxy groups and halogen, $n$ is an integer, 1 to one less than the number of carbons in R and $m$ is 1 or 2. The benzene ring of the hydroquinone may be substituted by one to four members of the group consisting of alkyl, alkoxy and halogen or by any combination of these groups. The condensation is accomplished by heating the required proportions of the reactants in the absence of a solvent and in the presence of a condensation catalyst, and the product is isolated from the reaction mixture by suitable means. The following reaction is typical.

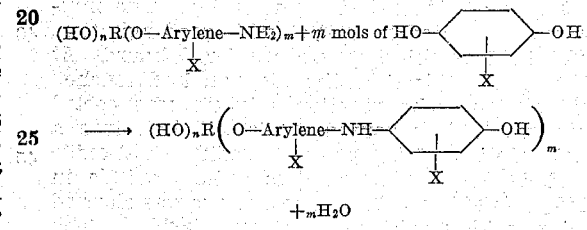

$$+ mH_2O$$

In cases where $m$ is 2 the Arylene compound is a diaryl diamine in which the aryl groups are bridged by a dialkoxy-hydroxy alkylene group of the kinds described.

The invention will be more fully set forth in the following more detailed description which includes examples that are given as illustrative embodiments of the invention and not as limitations thereof.

Example 1

One part of beta-hydroxy-p-phenetidine and 0.72 part of hydroquinone were mixed in an enamel-lined kettle which was provided with an agitator, a thermometer well and thermometer and a water-cooled delivery condenser. The mixture was heated to 150° C. At this temperature, 0.07 part of zinc chloride was added. The mixture was heated to 200°, with good agitation, and held at this temperature for 6 hours. At the end of this time the evolution of water had practically ceased. The molten reaction mixture was cooled to 130°, and then drowned in a solution of 0.3 part of sodium hydroxide and 0.6 part of sodium sulfide in 8.0 parts of hot water. The resulting suspension was slurried for a half hour at 85° C.; then 0.1 part of decolorizing carbon was added and the mixture was filtered. One part of sodium chloride was added to the filtrate, and the solution was chilled to 0° C. At this stage, a crystalline precipitate of the sodium salt of 4-(beta - hydroxy - ethoxy)-4'-hydroxy-diphenyl-amine precipitated out. This precipitate was filtered off and washed on the filter with 20% sodium chloride solution.

The moist sodium salt next was dissolved in 5 parts of water at 5° C. The solution was acidified weakly with acetic acid whereupon 4-(beta-hydroxy - ethoxy) - 4' - hydroxy - diphenylamine separated out in crystalline form. The product was filtered off and washed on the filter, first with 20% sodium chloride solution and finally with a small amount of cold water. The product was dried at 45° C. in a vacuum oven. One and one-tenth parts of crystalline 4-(beta-hydroxy-ethoxy)-4'-hydroxy-diphenylamine were obtained. This represents 70% of the theoretical amount. The purified compound melted at 106° C. The compound is represented by the formula

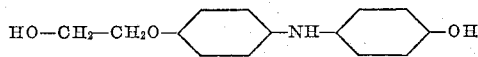

The compound is more soluble than 4-(ethoxy)-4'-hydroxy-diphenylamine. The dyestuff made by thionating the product was more soluble and gave dyeings which were more fast to bleaching agents than the thionated products from 4'-(ethoxy)-4-hydroxy-diphenylamine.

*Example 2*

A mixture of 15.3 parts of 4-(beta-hydroxy-propoxy)-aniline and 9.2 parts of hydyroquinone were heated to 140° C. in the apparatus used in the preceding example. At this temperature, 1.0 part of zinc chloride was added. The mixture was heated to 190° C. with good agitation, and held at this temperature for 5 hours. At the end of this time the reaction had reached completion. The reaction mixture was cooled somewhat, then poured, while still hot, into a hot solution of 2.3 parts of sodium hydroxide and 4.0 parts of crystalline sodium sulfide in 150 parts of hot water. The mixture was slurried for a half-hour at 85° C., then was clarified. The clear filtrate was chilled to 0° C. and acidified weakly with acetic acid. 4-(beta-hydroxy-propoxy)-4'-hydroxy-diphenylamine separated out as an oil which rapidly became crystalline. The product was filtered off and washed, first with 20% sodium chloride solution and finally with a little cold water. The yield of product, dried in a vacuum oven at 40° C., amounted to 12.9 parts, 56% of the theoretical amount. The dry substance melted at 156° C.

The compound has comparatively better solubility and the thionated products have comparatively better solubility and give dyeings which are faster to bleaching agents than similar compounds which do not contain the alkoxy group. The compound is represented by the formula

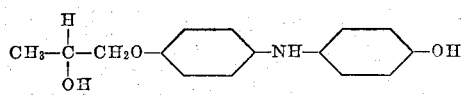

*Example 3*

In the same apparatus described in the preceding examples, 14.1 parts of 4-(beta-gamma-dihydroxy-propoxy)-aniline was mixed with 8.5 parts of hydroquinone. The mixture was heated to 150° C., and 1.0 part of aluminum chloride was added. Then the mixture was heated to 180° C. and held at this temperature, with good agitation, for 6 hours. At the end of this time, the reaction mixture was cooled somewhat and poured, while still molten, into a solution of 2.2 parts of sodium hydroxide and 3.7 parts of crystalline sodium sulfide in 150 parts of water. The resulting suspension was agitated at 90° C. for an hour, then clarified. The filtrate was chilled and acidified weakly with acetic acid, whereupon 4 - (beta - gamma - dihydroxy - isopropoxy) 4' - hydroxy-diphenylamine separated out in the form of an amorphous white precipitate. The product was filtered off and washed, first with brine and finally with a small amount of cold water. This product was held in the moist state. On a dry basis, the yield of product was 11.4 parts, or 50% of the theoretical amount.

As compared to similar compounds which do not contain the hydroxy-alkoxy group, the products have the improved properties noted in the preceding examples. The product is represented by the formula

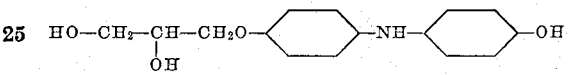

*Example 4*

A mixture of 16.6 parts of 4-(beta-hydroxy-isobutoxy) aniline and 9.2 parts of hydroquinone was heated to 120° C. At this temperature, 1.0 part of ferric chloride was added. The temperature of the mixture was raised to 200° C. and held at this point for 3 hours. At the end of this time, the reaction mixture was cooled somewhat and poured, while still molten, into a solution of 2.0 parts of sodium hydroxide and 4.0 parts of crystalline sodium sulfide in 150 parts of hot water. When the desired product had dissolved, the solution was clarified and the product precipitated by acidification in the manner already described. The product was a tarry mass. About 13.7 parts of the moist product were obtained.

A solution of the product in dilute sodium hydroxide, "spotted" on filter paper, developed a deep lavender coloration.

As compared to similar compounds which do not contain the hydroxy-alkoxy group, the products have the improved properties noted in the preceding examples. The product is represented by the formula

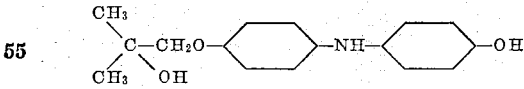

*Example 5*

A mixture of 9.4 parts of beta-hydroxy-p-phenetidine and 7.7 parts of toluhydroquinone were mixed together and heated to 150 C. At this temperature, 1.0 part of ferric chloride was added; the mixture was heated to 180° C. and held at this temperature, with good agitation, for 12 hours. At the end of this time, the mixture was cooled somewhat, then drowned while still molten in a hot solution of 1.7 parts of sodium hydroxide and 3.0 parts of crystalline sodium sulfide in 100 parts of water. The dissolved product was isolated in the manner described in the previous examples. It was obtained as a mixture of tar and fine crystals. It was soluble in dilute sodium hydroxide solution. Exposed to the air, this solution developed a deep red-brown coloration. Approximately 10.0 parts of 4 - (beta - hydroxy - ethoxy) - 3' - methyl - 4' - hydroxy-diphenylamine, dry basis were obtained.

As compared to similar compounds which do not contain the hydroxy-alkoxy group, the products have the improved properties noted in the preceding examples. The product is represented by the formula

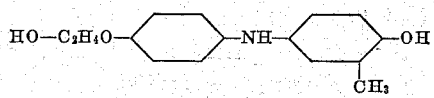

*Example 6*

A mixture of 11.5 parts of 1,3-di(4'-aminophenoxy)-2-hydroxy-propane, 9.2 parts of toluhydroquinone and 1.0 part of zinc chloride was heated to 200° C. and held at this temperature for about 6 hours, or until the evolution of water had ceased. At the end of this time, the molten reaction mixture was drowned in a solution of 2.3 parts of sodium hydroxide and 4.0 parts of crystalline sodium sulfide in 100 parts of water. After a proper period of agitation, the solution was clarified and the product isolated in the usual way. The product was solid and amorphous. A solution of it in dilute sodium hydroxide developed a brown spot when exposed to the air on filter paper.

As compared to similar compounds which do not contain the hydroxy-alkoxy group, the products have the improved properties noted in the preceding examples. The product is represented by the formula

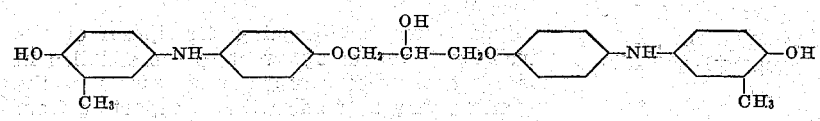

In general the compounds are represented by the formula

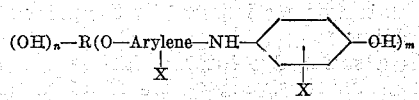

in which R is a hydrocarbon containing 2 to 6 carbons and is an alkylene or cycloalkylene radical, Arylene is the nucleus of a compound of the benzene series, that is a single-benzene-ring compound, and each X is one to four members of the group consisting of hydrogen, methyl, ethyl, propyl, isopropyl, the corresponding alkoxy groups and halogen, $n$ is an integer not greater than one less than the number of carbons in R, and $m$ is an integer not greater than 2. In the compounds of the invention the groups X may be alike or different in the aryl nuclei and there may be as many as four of these substituents. They may be similarly or dissimilarly substituted in the aryl nuclei.

In preparing the diphenylamine compounds of the invention, it is preferable to use a small excess over an equimolecular proportion of the hydroxy substituted alkoxyarylamine, say 1.1 mol to each equivalent of hydroquinone to be condensed. The catalyst is preferably added to the melt, and the mixture is heated at a suitable temperature with good agitation until the evolution of water has decreased to a small fraction of its original value at which time the condensation will have been completed. The best results are obtained by heating the mixture at temperatures between about 170° C. and about 220° C. Considerably higher and considerably lower temperatures can be used and the term "about 170° to about 220°" in the specification and claims refers to practicable working temperatures. The condensation goes on slowly if the temperature is below the optimum for the reactants involved, and if the temperature is so high that the reactants or the condensation product will decompose, the mixture will be darkened and there will be an undesirable formation of tarry by-products. Any elevated condensation temperature which will rapidly affect condensation without excessive decomposition can be used satisfactorily.

Upon completion of the condensation the reaction mixture is drowned in water which contains an excess of sodium hydroxide and sodium sulfide over that theoretically necessary to react with and precipitate the metal salt which was added as catalyst. The temperature of this solution is desirably about 70° to about 80° C. but water at any temperature which is higher or lower can be used. A slurry is made and when the condensation product is in solution, the mixture is clarified by suitable means. The clear solution is then acidified, as for example by cooling to room temperature and adding a weak organic acid, such as acetic acid, and the omega-hydroxy-alkoxy-4' - hydroxy-diphenylamine precipitates, often in a crystalline state. The mixture is then filtered and the product on the filter is washed.

The products may be easily oxidized by atmospheric oxygen to highly colored indophenols which can be represented by the general formula

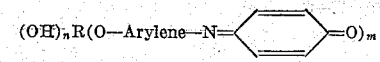

For this reason the products are protected from contact with the air as far as possible. It is desirable to store the products in moist condition or to use them soon after they are prepared.

Desirable catalysts are aluminum chloride, ferric chloride and zinc chloride but other metal salts of hydrochloric acid, even hydrochloric acid can sometimes be used. Other useful catalysts are the chlorides of antimony and arsenic.

The intermediates are preferably isolated from the by-products of the condensation by solution in warm dilute alkalies in the presence of reducing agents. The function of the reducing agents is to prevent the oxidation of the hydroxy-diphenylamine to an indophenol. For this purpose, any reducing agent may be used, although sodium-sulfide or sodium-hydrosulfite are most commonly used. In some cases, no reducing agent may be required; and in other cases, the crude product may be pure enough for use as an intermediate without purification of any sort. The purification of the crude product by extraction with sodium-hydroxide is a convenient method, but is not an essential part of the reaction.

In certain cases, the alkali metal salt, such as the sodium salt of the leuco-indophenol is sufficiently insoluble to enable crystallizing it from solution. This product is fully as suitable for thionation as the "acidic" form of the leuco-indophenol, and the two forms are equivalent.

Other compounds illustrative of the invention which can be made by processes similar to those disclosed are compounds such as those represented generally by the formula

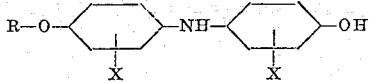

in which R is β-hydroxy-ethyl, β-hydroxy-propyl, β:γ-dihydroxy-propyl, β-hydroxy-isobutyl, alpha-hydroxy-cyclohexyl or sorbityl radical; compounds represented generally by the formula

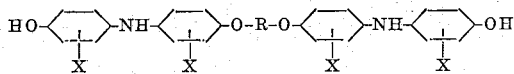

in which R is a beta-hydroxy propylene group or an alpha-hydroxy cyclohexylene group. Other illustrations are 4-(beta-hydroxy ethoxy)-2-methoxy-4'-hydroxy diphenylamine

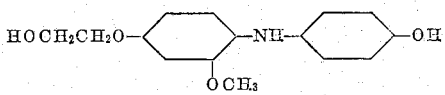

4-(beta-hydroxy ethoxy)-2-propyl-4'-hydroxy diphenylamine, 4-(beta-hydroxy)-2-chloro-4'-hydroxy diphenylamine, 4-(beta-hydroxy isobutoxy)-3'-methyl-4'-hydroxy diphenylamine

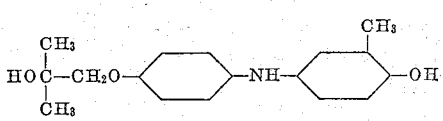

4-(beta-hydroxy isobutoxy)-3'-methoxy-4'-hydroxy diphenylamine, 4-(beta-hydroxy isobutoxy)-3'-chloro-4'-hydroxy diphenylamine, 2,5-dimethyl-4-(beta- hydroxy propoxy)-2',5'-dimethyl-4'-hydroxy diphenylamine

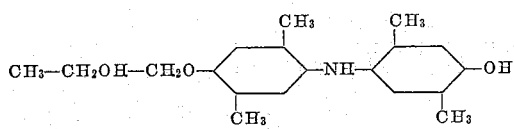

1:3-di-(4'(4''-hydroxy-3''-methyl) anilide-2':5'-dimethoxy)-2-hydroxy propane

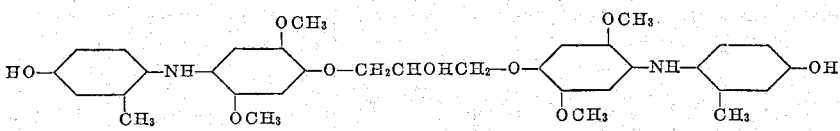

1:2:5:6:1':2':5':6'-octamethyl-4-(β-γ-dihydroxy propoxy)-4'-hydroxy diphenylamine

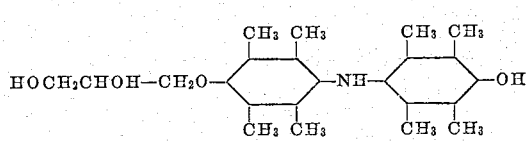

1:2:5:6:1':2':5':6'-octachloro-4-(β-γ-dihydroxy propoxy)-4'-hydroxy diphenylamine, 1:2:5:6-tetramethyl-2'-chloro-4-(β-γ-dihydroxy propoxy)-4'-hydroxy diphenylamine, 4-(Δ-hydroxy amyloxy)-4'-hydroxy diphenylamine

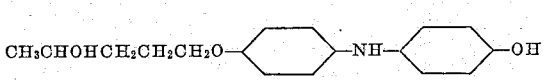

4-(Δhydroxy amyloxy)-2-methyl-4'-hydroxy diphenylamine, 4-(γ:δ-dihydroxy amyloxy)-4'-hydroxy diphenylamine

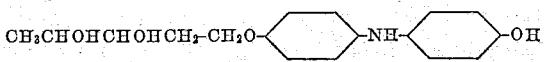

and the X-substituted compounds of this type, 4-sorbitoxy-4'-hydroxy:diphenylamine

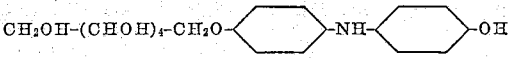

4-(alpha-hydroxy cyclohexoxy)-4'-hydroxy diphenylamine

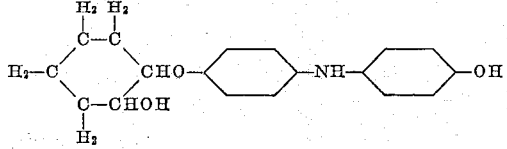

and many other substituted compounds of these types as hereinbefore described.

The compounds of the invention are more soluble than sulfur dye intermediates which do not have an hydroxy group in the alkoxy member. When thionated, the thionated products are much more easily oxidized on the fiber and the dyeings are more fast to bleaching agents than thionated alkoxy-diphenylamines which have no hydroxy groups. The thionated products oxidize on the fiber to give non-specky dyeings. It is our present opinion that the improved dyeings are due to the uniform and active solubility and oxidizability of the dyestuffs but it is to be understood that all the precise reasons for improved results are unknown to applicants and the invention is not to be limited by the suggested theory. The new products provide the means for making sulfur dyes having greatly improved working properties.

Since from the foregoing description of the invention it will be apparent to those skilled in the art that various other embodiments of the invention may be made without departing from the spirit and scope thereof, it is to be understood that no limitations are intended except those which are specifically recited in the annexed claims or are imposed by the prior art.

We claim:

1. As a sulfur dye intermediate, a compound of the group consisting of the alkali metal salt

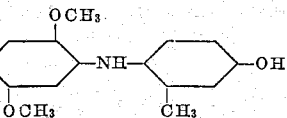

of the compound and the compound represented by the formula

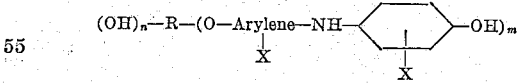

in which R is a radical having 2 to 6 carbons of the group consisting of straight chain alkyl, branched chain alkyl and cycloalkyl; Arylene is a radical of the benzene series, each X is at least one of a group consisting of hydrogen, methyl, ethyl, propyl, the corresponding alkoxy groups and halogen, n is an integer 1 to one less than the number of carbons in R, and m is an integer not greater than 2.

2. A compound represented by the formula

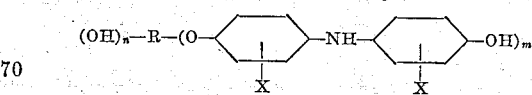

in which R is a radical having 2 to 6 carbons of the group consisting of straight chain alkyl, branched chain alkyl and cycloalkyl; each X is at least one of a group consisting of hydrogen, methyl, ethyl, propyl, the corresponding alkoxy groups and halogen; $n$ is 1 to one less than the number of carbons in R and $m$ is an integer not greater than 2.

3. 4-(beta - hydroxy-ethoxy) - 4'-hydroxy-diphenylamine.

4. 4-(beta-hydroxy propoxy) - 4'-hydroxy-diphenylamine.

5. The process which comprises mixing a hydroquinone; a condensation catalyst and a compound represented by the formula

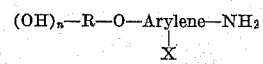

in which R is a nucleus having 2 to 6 carbons of the group consisting of straight and branched chain alkylene groups and cycloalkylene groups, Arylene is a radical of the benzene series and X is at least one of a group consisting of hydrogen, methyl, ethyl, propyl, isopropyl, the corresponding alkoxy groups and halogen and $n$ is 1 to one less than the number of carbons in R; and heating said mixture at melting temperatures until condensation has taken place.

6. The process which comprises mixing a hydroquinone; a condensation catalyst and a compound represented by the formula

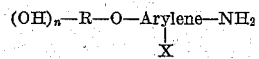

in which R is a nucleus having 2 to 6 carbons of the group consisting of straight and branched chain alkylene groups and cycloalkylene groups, Arylene is a radical of the benzene series and X is at least one of a group consisting of hydrogen, methyl, ethyl, propyl, isopropyl, the corresponding alkoxy groups and halogen and $n$ is 1 to one less than the number of carbons in R; and heating said mixture at temperatures between about 170° C. and about 220° C. until condensation has taken place.

7. The process which comprises mixing a hydroquinone, a condensation catalyst and a compound represented by the formula

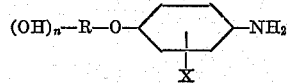

in which R is a radical having 2 to 6 carbons of the group consisting of straight and branched chain alkylene and cycloalkylene groups; X is at least one of a group consisting of hydrogen, methyl, ethyl, propyl, isopropyl, the corresponding alkoxy groups and halogens; and $n$ is 1 to one less than the number of carbons in R; and heating said mixture at melting temperatures until condensation has taken place.

8. The process which comprises mixing a hydroquinone, a condensation catalyst and a (4-beta-hydroxy-alkoxy)-phenylamine in which alkoxy has 1 to 3 carbons, and heating the mixture until a condensation product is produced.

9. The process which comprises mixing a hydroquinone, a condensation catalyst and a (4-beta-hydroxy-alkoxy)-phenyl amine in which alkoxy has 1 to 3 carbons, and heating the mixture at temperatures between 170° C. and about 220° C. until a condensation product is produced.

10. The process which comprises mixing a hydroquinone and 4-(beta hydroxy ethoxy)-phenylamine in approximately molecular proportions, adding a condensation catalyst, and heating until a condensation product is produced.

11. The process which comprises mixing a hydroquinone and 4-(beta hydroxy ethoxy)-phenylamine in approximately molecular proportions, adding a condensation catalyst, and heating at temperatures between about 170° and 220° C.

12. The process which comprises mixing a hydroquinone and 4-(beta hydroxy propoxy)-phenyl amine in approximately molecular proportions, adding a condensation catalyst, and heating until a condensation product is produced.

13. The process which comprises mixing a hydroquinone and 4-(beta hydroxy propoxy)-phenyl amine in approximately molecular proportions, adding a condensation catalyst, and heating at temperatures between about 170° and 220° C.

NEWELL M. BIGELOW.
JOHN ELTON COLE.